April 2, 1940.  W. M. ANDERSON  2,195,637
ELECTRIC TOASTER
Filed Oct. 18, 1937  4 Sheets-Sheet 1
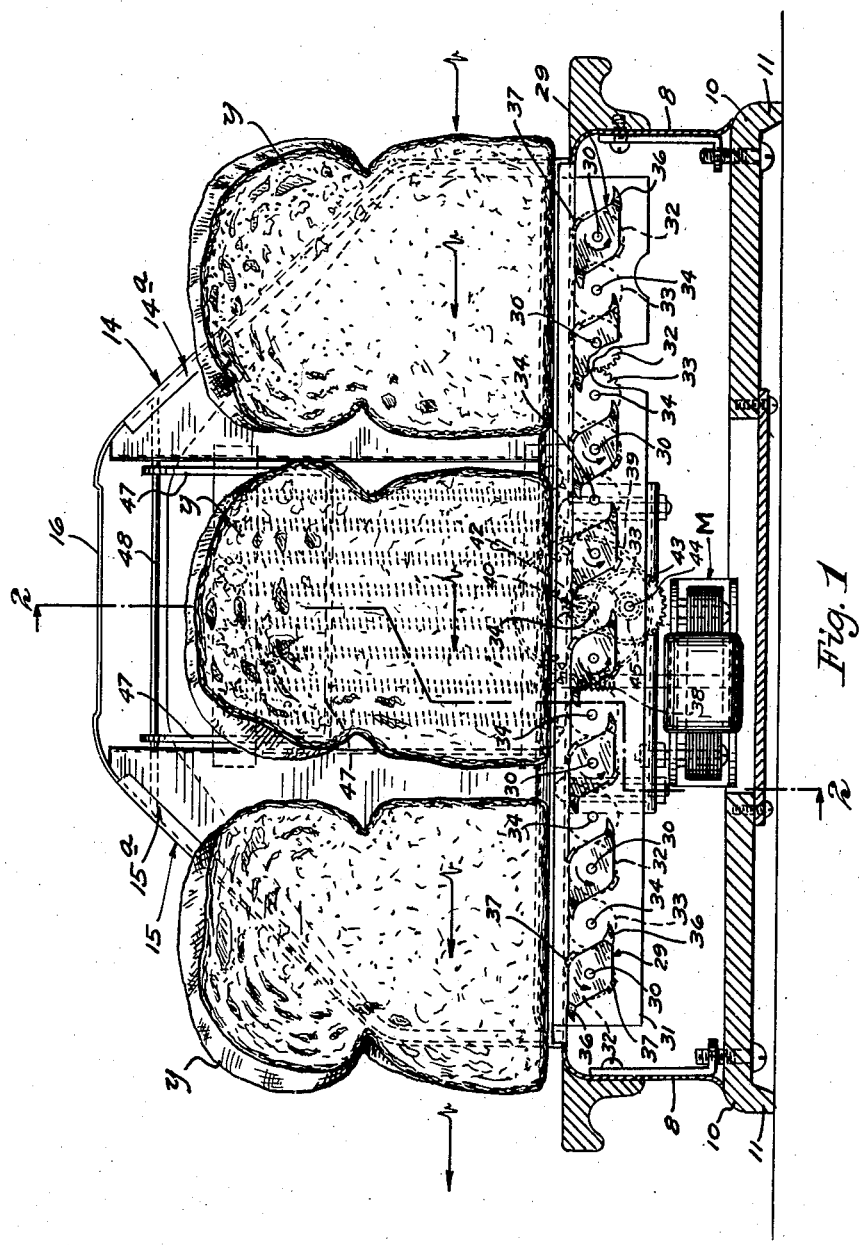
Inventor
William M. Anderson
By Merchant & Merchant
Attorneys April 2, 1940.  W. M. ANDERSON  2,195,637
ELECTRIC TOASTER
Filed Oct. 18, 1937  4 Sheets-Sheet 2
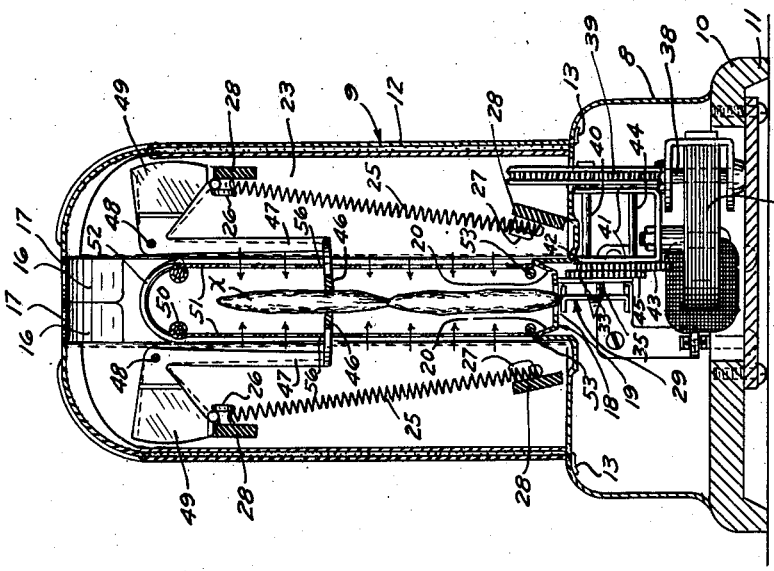
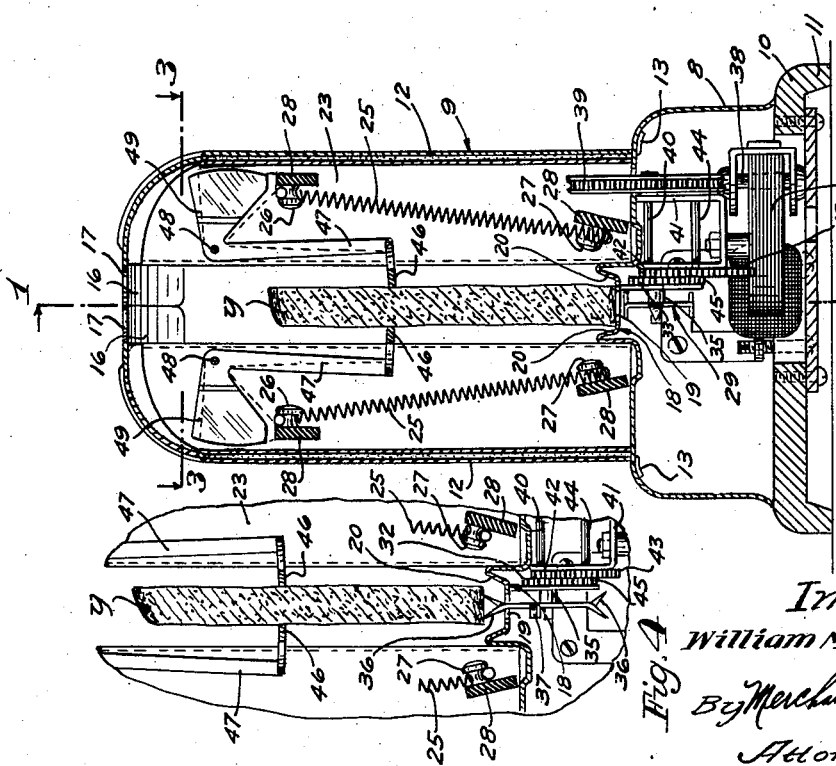
Inventor
William M. Anderson
By Merchant & Merchant
Attorneys April 2, 1940.  W. M. ANDERSON  2,195,637
ELECTRIC TOASTER
Filed Oct. 18, 1937  4 Sheets-Sheet 3
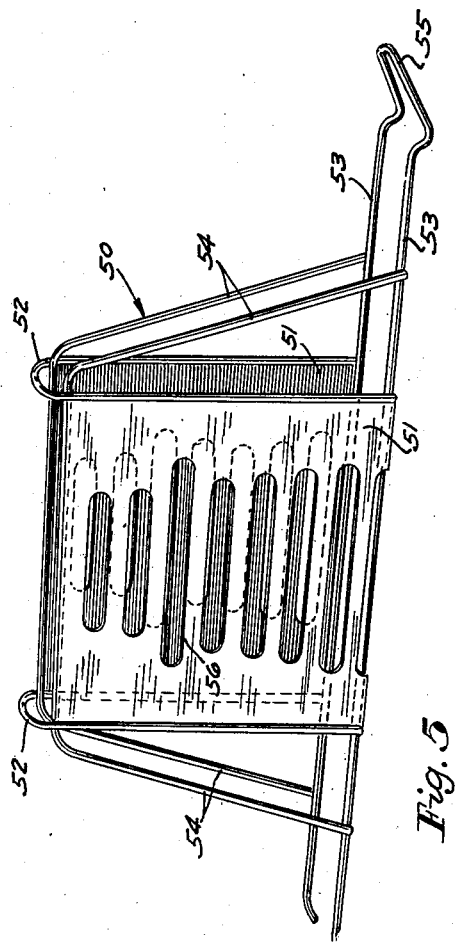
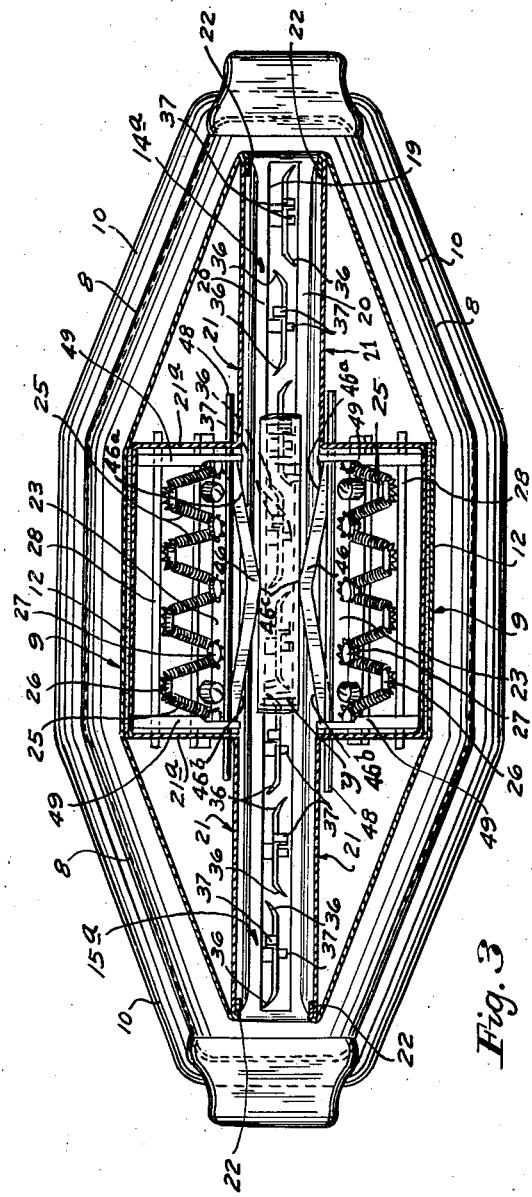
Inventor
William M. Anderson
By Merchant & Merchant
Attorneys April 2, 1940.　　W. M. ANDERSON　　2,195,637
ELECTRIC TOASTER
Filed Oct. 18, 1937　　4 Sheets-Sheet 4

Inventor
William M. Anderson
By Merchant & Merchant
Attorneys

Patented Apr. 2, 1940

2,195,637

UNITED STATES PATENT OFFICE 2,195,637

ELECTRIC TOASTER

William M. Anderson, Minneapolis, Minn., assignor to F. J. Kerner and himself, both of Minneapolis, Minn., a copartnership Application October 18, 1937, Serial No. 169,637

24 Claims. (Cl. 219—19)

This invention relates to that type of cooking apparatus generally designated as a toaster, and more particularly relates to toasters of the type employed for the toasting of sheet material such as bread slices, crackers, or the like.

More specifically stated, the invention relates particularly to a type of automatic toaster in which bread slices, crackers, or similar sheet material may be fed in a more or less continuous stream through a heated oven so that the toasting action may be carried out in a substantially continuous manner by placing bread slices in position on edge one behind the other so that there will be a substantially continuous infeed of material and a substantially continuous outfeed or discharge of toasted material.

Among the important objects of the invention is a provision of an improved type of feed mechanism that is adapted for continuous operation and which will maintain a substantially continuous infeed and outfeed of material through the toaster oven.

Another important object of the invention is a provision of a feed mechanism of the general character above designated which is inexpensive to produce, highly dependable in service, and which may be made to maintain a very slow flow of material through the toasting oven with a minimum of speed reducing gearing when driven from a relatively high speed prime mover such as a suitable electric motor.

Another important object of the invention is a provision of a feed mechanism of the continuous operating type which will automatically move materials of different thicknesses through the oven at different speeds.

Another highly important object of the invention is the provision in a toaster of the general character described and which includes a toasting oven having laterally spaced heating means and feed mechanism extending longitudinally through the space between the spaced heating means and engageable with the bottom edge of sheet material placed vertically thereon, of a novel arrangement for supporting the sheet material against lateral tipping movements and in vertical position centered between the heating means during its passage through the oven.

Still another important object of the invention is a provision in a toaster of the type designated of a novel baffle arrangement for reducing the amount of heat applied to certain types of material such as crackers which require and will stand less heat than other classes of sheet material such as bread slices.

The above noted and numerous other highly important objects and advantages of the invention will be made apparent from the following specifications and claims.

Generally stated, the invention consists in novel devices, combination of devices, and arranging of parts hereinafter described and defined.

In the accompanying drawings, like characters indicate like parts throughout the several views.

Referring to the drawings:

Fig. 1 is a longitudinal vertical sectional view throughout the toaster taken on the line 1—1 of Fig. 2, with some parts on the sectional line shown in full;

Fig. 2 is a transverse vertical sectional view taken in the vicinity of the irregular section line 2—2 of Fig. 1;

Fig. 3 is a horizontal sectional view taken on the line 3—3 of Fig. 2 and looking downwardly;

Fig. 4 is a fragmentary view corresponding to Fig. 1 by showing a slightly different position of the feed mechanism;

Fig. 5 is a perspective view of a baffle device that is adapted to be employed in the toaster oven to reduce the rate of delivery of heat to material passing through the oven;

Fig. 7 is a transverse vertical sectional view similar to Fig. 2 but taken on the irregular line 7—7 of Fig. 6.

Figure 6:
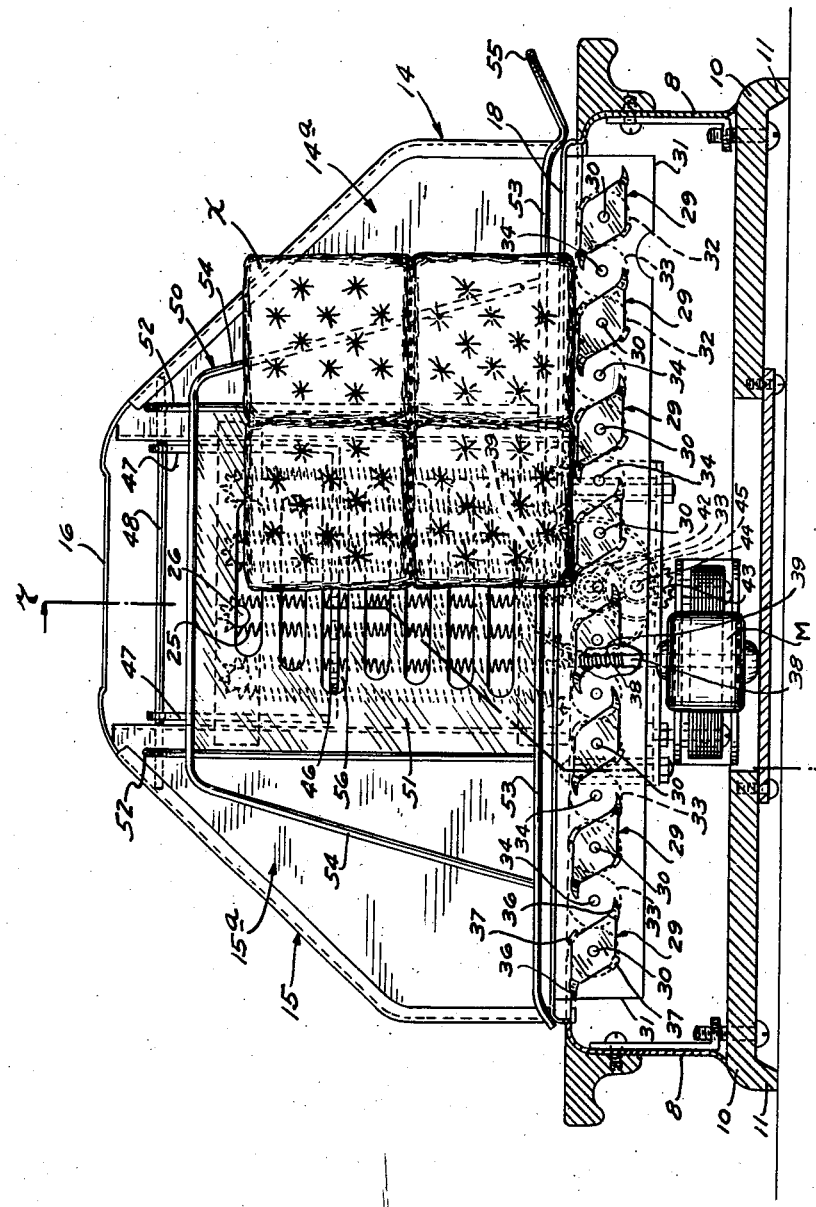
Fig. 6 is a longitudinal vertical sectional view similar to Fig. 1 but further illustrating the baffle device of Fig. 5 operatively positioned within the toaster.

The main body of the toaster is made up of two main parts to wit; an elongated pressed metal base 8; and a shell or casing 9 that is mounted on the base 8. The open bottom of the base 8 rests on and is normally closed by a mounting plate 10 that is provided with suitable feet 11.

The shell or casing 9 is made up of oppositely disposed like sections 12 that are mounted upon the top of the base 8 by means of integrally formed anchor lugs 13 that are passed through suitable apertures in the base 8 and are bent over beneath the top of the base. These shell sections 12 are laterally spaced at their opposite end portions to provide aligned inlet and outlet openings 14 and 15, respectively. At their intermediate top portions, the shell sections 12 are provided with inwardly turned bridge sections 16, which together bridge the space between the sections 12 and may be assumed to be suitably tied together by welding or the like. As will hereinafter be seen, the so called bridge sections 16 form the top of the toaster oven and for the purpose of suitably ventilating the toaster oven, the said bridge sections 16 are provided with suitable vent apertures 17.

The base 8 is formed between the inlet and outlet openings 14 and 15 respectively with a channel shaped way, which way is cut away at its intermediate portion to form a longitudinal slot 19 that extends substantially from end to end thereof, and effectively divides the way into laterally spaced flanged guide rails 20.

Disposed within each of the opposite sections 12 is a horizontal U shaped partition wall forming member 21. These partition forming members 21 extend vertically between the base 8 and the upper marginal portions of the casing sections 12 and are held in inturned edges 22 on said opposed casing sections 12. The outer end portion of the U shaped partition forming members 21 are disposed immediately adjacent the flanged guide rails 20 of the way 18 and afford narrow inlet and outlet passageways 14a and 15a leading respectively to and from an oven chamber 23 formed between opposed off-set immediate portions of the opposed U shaped partition members 21. The ends of the oven chamber 23 are defined by the transverse wall portions 21a of the partition members 21.

For heating the oven chamber 23, there is provided suitable electrical heating elements 25. These heating elements 25 are alike and are each disposed within opposed sides of the oven chamber 23 between the transverse wall portions 21a of an opposed U shaped forming member 21. Each of these heating elements 25 is in the nature of a spirally coiled resistance wire strung back and forth over suitable supporting insulators 26 and 27. The supporting insulators 26 and 27 are formed as part of or suitably secured to longitudinally extended support bars 28. These supporting bars 28 which are of suitable electrical insulating and heating resistance material, are slightly longer than the oven chamber 23 and extend through suitable apertures in the oven and forming walls 21a of the partition forming members 21 so that each entire heating element structure is carried by an opposite partition forming member 21.

Preferably and as illustrated by the drawings, the opposed heating elements 25 diverge outwardly from the bottom toward the top so as to obtain uniform application of heat from bottom to top of material passing through the oven. In this respect, it will be noted that the upper longitudinally extended element supporting bars 28 are spaced apart considerably further than the bars 28. Since the heat elements illustrated are of the type which generate and radiate heat uniformly from top to bottom, or substantially, and since heat rises rapidly, the accumulative heat effect toward the upper portion of the toasting oven would cause faster toasting of material near the top of the toasting oven than near the lower portion thereof, were it not for the fact that the elements 25 are spaced progressively further apart from bottom to top. The intermediate, laterally off-set longitudinal wall portions of the partition member 21 are disposed closely adjacent the outer walls of the casing sections 12 and are preferably heat insulated from said casing walls by a suitable layer of asbestos or the like 24.

For feeding sheet like material such as bread slices, crackers and the like placed in the narrow inlet passage way 14a progressively through said inlet passage way 14a, the oven chamber 23, and the narrow vertical outlet 15a, there is provided a novel feed mechanism immediately to be described in detail.

This novel feed mechanism includes a train like series of like rotary feed elements 29 each of which are journaled below the way 18 transversely thereof. The series of rotary feed elements or devices 29 extend in a straight line longitudinally of the way 18 and is vertically aligned with the slot 19 in said way and all thereof are equally spaced from said way. The several rotary feed devices or elements 29 are each mounted fast on a short pin-like stub shaft 30. These stub shafts 30 each project through and are journaled in a longitudinally extended support 31, and mounted fast on the opposite end of each thereof is a drive gear 32. The several drive gears 32 form part of a long train of gears consisting thereof and intermediate idle gears 33 which latter are supported from the mounting member 31 through the medium of fixed journal pins 34.

As will be seen particularly by reference to Fig. 4, the rotary feed elements 29 are spaced from the mounting member 31 by means of a spacing sleeve 35. Preferably, and as herein illustrated the rotary feed elements or devices 29 are each formed with radially projecting diametrically opposed pair of long feed dogs 36, and intermediate said long feed dogs 36 with a diametrically opposed pair of radially projecting relatively short feed dogs 37. The adjacent long and short feed dogs 36 and 37, respectively, are preferably spaced 90° apart. The long feed dogs 36 have a radial measurement greater than the distance between the axis thereof and the supporting surface of the way 18, so that under rotation they will alternately project through the way slot 19 and engage and impart step movement to relatively thick sheet material such as the bread slices y resting on the surface of the way and spanning the way slot 19. The short feed dogs 37, on the other hand, have a radial measurement less than the distance between the axis thereof and the supporting surface of the way so that under rotation they will remain below the surface of the way and be engaged only with thin sheet material, such as slabs of crackers or the like x that work through the slot 19 in said way. (See particularly Figs. 6 and 7.) With this arrangement, it will be obvious, that thin sheet material such as the crackers x which work through the way slot 19 will be engaged and moved alternately by the long and short feed dogs 36 and 37 respectively, and will therefore, be moved at a comparatively high rate of speed, whereas, relatively thick sheet material such as the bread slices y will be engaged and moved only by the long feed dogs 36 and will, therefore, be moved at a considerably reduced speed. The long and short feed dogs 36 and 37 of each rotary feed element 29 are bent over laterally in a like direction, and alternate of said rotary feed elements 29 are reversely applied so that the feed dogs 36 and 37 of alternate rotary feed elements laterally extend in opposite directions (see Figs. 2, 4, and 7), and the several of said rotary feed elements are rotatively positioned alike one with respect to the other. With this arrangement, the long feed dogs 36 of the several rotary feed elements are staggered to form an upwardly opening groove, when viewed longitudinally of the train of feed elements, when the long feed dogs are upwardly projected, and into which groove thin sheet material such as the crackers x are adapted to seat and to be retained against laterally sliding movement therefrom. Similarly, the short feed dogs 37 of alternate rotary feed elements, being projected in opposite directions, form over all a relatively wide supporting structure for thin material.

For driving the train of gears 32 and 33 and their associated rotary feed elements 29, there is provided a suitable electric motor M having projecting from its rotor a worm drive shaft 38. This worm drive shaft 38 meshes with a large diameter speed reducing worm gear 39 which worm gear is mounted fast on a shaft 40 journaled in a bearing bracket 41. Mounted fast on the other projected end of the shaft 40 is a small pinion gear 42 that meshes with a speed reducing spur gear 43. The spur gear 43 is mounted on a shaft 44 that is, in turn, journaled in the bearing bracket 41. Also, mounted on the shaft 44 concentric with the gear 43 is a small pinion gear 45 that meshes with an intermediate one of the gears 33 of the train of gears 32 and 33. With the gearing above described all of the rotary feed devices 29 will be rotated in unison when the motor M is in operation.

For automatically centering the slices of bread, crackers, or like sheet material, between opposite heating elements 25 during its passage through the toaster oven, I provide the highly effective but very simple mechanism presently to be described. Disposed within opposite sides of the toaster oven, in opposed relation are like yieldingly pressed guide shoes 46 that are adapted to slidably, frictionally engage opposite sides of the sheet material of various thicknesses as it passed through the oven, to support the latter in a vertical position laterally centered between the heating elements 25. These opposed friction shoes 46 form the lower longitudinally extended portions of U shaped brackets, the upright arms 46 of which are pivotally suspended on pivot rods 48 that extend longitudinally of the toaster and through the transverse walls 21a of the partition member 21. The upper end of the upright arms 47 are intricately formed with laterally outwardly upset counter weights 49 which, under the action of gravity, over balance the upright arms 47 and guide shoes 46 and tend to move the latter toward one and another to the maximum extent permitted by engagement of the counter balances 49 with the heating element supporting bars 28, which, latter act as stops. As illustrated best in Fig. 3, the shoes 46 each diverge outwardly with respect to one and another from their intermediate portions toward their longitudinal end portions, so as to form between them outwardly diverging inwardly converging entrance and outlet mouths 46a and 46b, respectively (see Fig. 5), and a longitudinally intermediate throat 46c. Under normal minimum spacing of the yieldingly inwardly pressed shoes, the maximum width of the mouths 46a and 46b will be greater than the thickness of the thickest sheet of material to be passed through the toaster, and the width of the throat 46c will preferably be of less width, or at least not materially greater width, than the thinnest sheet of material to be passed through the toaster, so that sheet material of different thicknesses will be permitted to enter between same and by outwardly camming action thereon will cause the same to yield outwardly under continued feeding movement.

The circuits of the motor M and electric heating elements 25 have not been shown, but it may, nevertheless, be assumed that said elements and motor will be energized from suitable source of power such as a domestic power line. Hence, to set the toaster in operation, the heat elements will be energized and will become heated to thereby set the several elements of the feed mechanism in motion. If relatively thick sheet material such as a slice of bread is to be toasted, this slice of bread may be placed in the narrow vertical inlet passage 14a with its bottom edge seated on the way 18, as shown at the right in Fig. 1. Since it takes some time for the heating elements 25 to heat the oven up to a desired toasting temperature, this operative positioning of the first slice of bread in the inlet passage may be delayed after initial energization of the heating element for a time sufficient to build up a desired toasting temperature in the oven, or, as an alternative, the energization of the feed motor M and consequent operation of the feed mechanism may be delayed until the desired toasting temperature has been built up in the oven, in which latter instance, the first slice of bread may be placed in operative position in the inlet passage way immediately after or even before energization of the heating elements.

Under rotation of the several rotary feed devices 29 which, will be in this instance, in a counter clockwise direction, as indicated by direction arrows in Fig. 1, the long feed dogs 36 of the elements 29, which underlie the inserted slice of bread $y$ will alternately engage the bottom edge of the bread slice and impart short steps of movement thereto in a direction from left toward the right with respect to Fig. 1. The long feed dogs 36 will, of course, raise the bread slices off the surface of the way 18 during their respective periods of operation thereon and will then drop the bread slice back on to the surface of the way where it will remain in a stationary position until the next long feed dog projects above the supporting surfaces of the way and engages the same. Under this alternate moving and pausing action from the inlet passage way 14a into and through the oven and outlet passage way 15a, from which, outlet passage 15a, it is ultimately discharged in a toasted condition, providing, of course, that a proper balance is obtained between the rate of heat delivery of the heating elements 25 and the overall speed of feeding material through the toasting oven. In this respect, however, it may be stated that the obtaining of desirably slow over all rate of speed through the toasting oven from a relatively high speed electric motor can be accomplished with minimum of speed reducing gearing when the mechanism described is employed. This is, of course, due to the fact that the rotary feed elements 29 operatively engage the bread slices for only short intervals during each complete rotation thereof and the balance of the time run idle and are completely inoperative on the material.

Obviously, under continuous operation of the feed mechanism, bread slices may be placed in the inlet passage way and made subject to action of the feed mechanism as rapidly as the feed mechanism moves a previously inserted slice of bread out of the inlet passage way 14a and into the toasting oven, and in this way a relatively continuous stream of bread slices may be passed through the toasting oven and discharged successively from the outlet passage way 15a.

During the passage of the toast through the narrow vertical inlet and outlet passages 14a and 15a, respectively, the walls of said passages will serve to support the bread slices in substantially vertical postions, but during the passage of the bread slices through the oven other means for holding the bread slice in a substantially vertical position and substantially equally spaced between the heating elements must be relied upon and in the mechanism described this important function is very effectively accomplished by means of the yieldingly pressed guide shoes 46 which come into engagement with the leading edges of bread slices while the rear edge or intermediate portions thereof are still within and subject to supporting action of the walls of the inlet passage way. These shoes 46 maintain their supporting engagement with the bread slices until the leading portions thereof have passed well into the outlet passage ways 15a and have become subject to supporting action of the walls thereof. If the shoes 46 are subject to like inwardly exerting yielding pressure they will cooperatively guide the bread slices through the toasting oven in very accurately centered relation to the opposed heating elements so that both sides of the upper portion of the bread slices, as well as the bottom portions thereof, will be subject to approximately the same degree of heat during their passage through the oven.

When a sheet of relatively thin material, such as a large cracker or slab or crackers x (see Figs. 6 and 7), is placed within the narrow inlet passage 14a such thin sheet of material will drop through the slot 19 in the way 18 and will come to rest directly upon the feed dogs 36 and 37 of a plurality of underlying rotary feed devices 29 and under rotation of the several rotary feed devices will be progressively moved through said inlet passage oven and outlet passage 15a at a rate of speed considerably accelerated with respect to the rate of movement imparted to thicker sheet material such as toast, which spans the way slot 19. Obviously, the reason for this accelerated feeding action on thin sheet material, which works through the slot, is due to the fact that thin sheet material such as the crackers x is always engaged by either the long feed dogs 36 or the short feed dogs 37 of the feed mechanism and is therefore, moved continuously or substantially continuously thereby, whereas, thick sheet material such as the toast y is operatively engaged only by the long feed dogs 36 and remains at rest between intervals of engagement by the long feed dogs 36. Although this feeding movement of thin sheet material through the toaster will be substantially continuous, it will nevertheless, be at an uneven rate of speed. That is to say, the material will be alternately moved at accelerated and retarded rates of speed as it is alternately engaged by the long and short feed dogs 36 and 37, respectively. The amount of this speed fluctuation will vary directly in accordance with the relative differences in length between the long and short feed dogs. The automatically accelerated overall rate of feed through the toaster when the thin sheet material is placed therein, is highly important in that thin sheet material requires less time for toasting than does thicker sheet material.

Another action of the feed mechanism which is important in connection with both thick and thin material but particularly in connection with the latter is the intermittent vertical movement imparted to the material during its passage through the toaster. If material is fed in a straight line through the toaster, it is apt to be unevenly toasted as a result of uneven distribution of heat rays over the surface thereof, but when it is moved alternately up and down under alternate engagement with the feed dogs as in the present toaster, these unevenesses are largely ironed out and a uniformly toasted product is later obtained. During the passage of thin material such as the slab of crackers x through the the toaster, this material will be supported by the guide shoes 46 in laterally centered relation in respect to the opposed heating elements just the same as is thick material such as the slice of bread y, since the guide shoes 46 are normally spaced apart a distance less than the thickness of the thinnest sheet material to be toasted in the machine.

Certain types of thin sheet material such as common soda crackers toast very rapidly and become over toasted and burned very easily. When such material as these soda crackers are to be toasted in the machine, it is usually necessary to further reduce the amount of heat applied to the material during its passage through the oven even beyond that accomplished by the automatically accelerated rate of feed through the oven. For accomplishing the further reduction in applied heat during the toasting operation, I provide a baffle device 50 which is insertable into the oven for this purpose and removed when not needed. This baffle device 50 comprises a pair of laterally spaced opposed baffle plates 51 that are suitably perforated to allow just the required amount of heat rays to pass therethrough and become effective upon the surface of the very thin sheet material such as crackers. These baffles 51 are connected together to form a unit by means of a wire frame. This frame is made up of inverted U shaped sections 52 that engage the front and rear opposite vertical edges of the opposite baffle plates 51 and bridge the space therebetween above the top thereof, longitudinally extended parallel wire bars 53 that are secured to the bottom horizontal edges of the opposing baffle plates 51, and diagonal braces 54. The frame elements 52, 53, and 54 are rigidly secured to the opposed baffle plates 51 by means of welding or the like.

The baffle unit 50 is inserted into the toaster as indicated in Figs. 6 and 7 and when in an operative position the ends of the horizontal bars 53 engage the end portions of the way 18 and project slightly beyond the ends of the way. The ends of the bars 53 that are normally adjacent the inlet passage opening 14 are tied together to form a handle portion 55. As will be seen, by reference to Figs. 6 and 7, the opposed baffle plates 51 are provided with slots 56 through which the transversely inwardly curved longitudinally intermediate portions of the guide shoes 46 are adapted to work in order that they may serve their guide functions on the crackers during their passage through the toaster oven while the baffle device is in its operative position. The yielding shoes 46 do, of course, readily yield under longitudinal inserting action of the baffle element to permit positioning of the latter and thereafter, fall into operative position through the slots 56. In the device disclosed, the combined action of automatically accelerated rate of feed through the toasting oven and the cutting down of the heat rays by the baffle member permits a desirable toasting of soda crackers with complete assurance that the same will not be burned, and this without the necessity of reducing the current flow through the heating elements.

What I claim is:

1. In an automatic toaster, a toasting oven having a narrow vertical passage way extending longitudinally therethrough, feed mechanism disposed below said passage way and adapted to support and move material progressively through the toasting oven, said feed mechanism comprising a series of horizontally journaled feed devices arranged in spaced relation longitudinally of the oven passage for progressively supportably engaging the bottom edge of sheet material and imparting feeding movement thereto, and means for imparting common uni-directional rotary movements to said rotary feed devices, said rotary feed devices each including at least one long radius feed dog and spaced at least 90° therefrom at least one relatively short radius feed dog, said several rotary feed devices being rotatively positioned alike.

2. The structure defined in claim 1 in which there is a diametrically opposed pair of said long radius feed dogs and a diametrically opposed pair of short radius feed dogs intermediate said long radius feed dogs.

3. The structure defined in claim 1 in which the said rotary feed devices including circumferentially spaced portions of relatively great and relatively small radial measurement are adapted to engage alternately sheet material, whereby the sheet material will be fed alternately at relatively high and relatively low speed in a horizontal direction and will be alternately raised and lowered during its passage through the oven.

4. In an automatic electric toaster, a toasting oven having a vertical passageway therethrough, a narrow longitudinal slot in the bottom of said passage way, and feed mechanism for moving sheet like material through said passage, said feed mechanism including a train of like rotary elements horizontally journaled below the slotted bottom of said passage and each working radially in said slot for direct peripheral engagement with the bottom edge of sheet material, said train of rotary drive elements being connected together for common rotary movements by driving connections located below the bottom of the oven passage and in laterally offset relation with respect to the slot in the bottom of said passage.

5. In an automatic electric toaster, a toasting oven having a narrow vertical passage therethrough, a way forming the bottom of said passage and adapted to support sheet-like material on edge and having a longitudinal slot extended substantially from end to end thereof, and feed mechanism for moving sheet-like material progressively through said passage way, said feed mechanism comprising a series of like rotary elements horizontally journaled below said way and having circumferentially spaced radially projecting portions adapted under rotation to alternately project through the slot in said way and impart steps of movement to the sheet-like material.

6. In an automatic electric toaster, a toasting oven having a vertical passage therethrough, a narrow longitudinal slot in the bottom of said passage extending substantially from end to end thereof, and feed mechanism for moving sheet-like material progressively through said passage, said feed mechanism comprising a series of like rotary feed devices horizontally journaled below the bottom of said passage in longitudinally spaced relation and alignment with the slot in said passage each of said rotary feed devices having circumferentially spaced radially projecting feed dogs the radii of which is greater than the distance between the axis of said rotary feed devices and the bottom of the narrow passage so that, under rotation, they will alternately project through the slot in the said passage, and intermediate said circumferentially spaced feed dogs, said feed devices having circumferentially spaced portions, the radii of which are less than the distance between the axis thereof and the bottom of said passage way, said feed dogs being so spaced circumferentially that only one thereof at a time will project through the passage slot.

7. In an automatic electric toaster, a toasting oven having a vertical passage therethrough, a narrow longitudinal slot in the bottom of said passage extending substantially from end to end thereof, and feed mechanism for moving sheet-like material progressively through said passage, said feed mechanism comprising a series of like rotary feed devices horizontally journaled below the bottom of said passage in longitudinally spaced relation and alignment with the slot in said passage each of said rotary feed devices having circumferentially spaced radially projecting feed dogs the radii of which is greater than the distance between the axis of said rotary feed devices and the bottom of the narrow passage so that, under rotation, they will alternatly project through the slot in the said passage, and intermediate said circumferentially spaced feed dogs, said feed devices having circumferentially spaced portions, the radii of which are less than the distance between the axis thereof and the bottom of said passage way, said projecting dogs being so spaced apart circumferentially that under continuous rotation of said rotary feed devices, there will be intervals between the time one of said feed dogs passes below the bottom of passage and the time the next thereof projects above the bottom of the passage.

8. In an automatic electric toaster, a toasting oven having a vertical passage therethrough, a narrow longitudinal slot in the bottom of said passage, and feed mechanism for moving sheet-like material through said passage, said feed mechanism including a train of like rotary elements horizontally journaled below the slotted bottom of said passage in alignment with said slot, at least one feed dog radially projecting from each of said rotary feed elements and having a radius greater than the distance between the axis and the slotted bottom of the passage thereof.

9. In an electric toaster, a longitudinally extended way adapted to support bread slices on edge and having a longitudinal slot in the transverse center thereof, a series of rotary feed devices journaled below the bottom of said way in longitudinally spaced relation to one another and in vertical alignment with the slot in said way, each of said rotary feed elements having a substantially radially projecting feed dog with a radial measurement greater than the distance between the axis thereof and the supporting surface of the way, and adjacent said feed dog said feed devices having circumferentially extended portions with a radius less than the distance between the axis thereof and the supporting surface of the said way, the construction and arrangement being such that throughout part of each rotation of each of said fed devices, a projecting feed dog will extend through the way slot and engage and impart movement of bread slices and throughout other parts of the complete rotation the bread slices will be disengaged by the feed mechanism and remain seated on said way, and means for imparting uni-directional rotary movement to the feed devices.

10. The structure defined in claim 9 in which there are a plurality of said radially projecting feed dogs projecting from the rotary feed device in circumferentially spaced relation and in which circumferentially spaced feed dogs are so spaced apart circumferentially that there will be intervals during each complete rotation that there will be no part of the feed device projecting through the slot in the way for engagement with material.

11. In an electric toaster, a longitudinally extended way adapted to support relatively thick sheet-like material on edge, a longitudinal slot extending longitudinally through the approximate transverse center thereby, and feed mechanism including at least one rotary feed device journaled below said way transversely thereof and in vertical alignment with said slot, said rotary feed device incorporating at least one short feed dog having a radius less than the distance between the axis thereof and the supporting surface of said way for engagement with thin sheet material working through said slot, said rotary feed device also incorporating, in circumferentially spaced relation to said short feed dog, a relatively long feed dog having a radius greater than the distance between the axis thereof and the supporting surface of said way for engagement with relatively thick sheet material supported on the surface of said way and with thin sheet material that works through said slot and is also engaged by said short feed dog, whereby thin sheets of material working through said way slot will be moved at higher speed than thicker sheet material supported on said way.

12. In an electric toaster, a longitudinally extended way to support relatively thick sheet material on edge, a longitudinal slot in said way adapted to receive thin sheet material, and feed mechanism including at least one rotary feed device journaled below said way transversely thereof and in vertical alignment with said slot, said rotary feed device incorporating circumferentially spaced short feed dogs each having a radius less than the distance between the axis thereof and the supporting surface of said way for engagement with thin sheet material working through said slot, said rotary feed device also incorporating intermediate said short feed lugs and in circumferentially spaced relation to the latter relatively long feed dogs each having a radius greater than the distance between the axis thereof and the supporting surface of the way for engagement with relatively thick sheet material supported on the surface of said way and with thin sheet material that works through said slot, whereby thin sheet material working through said slot will be engaged alternately by long and short feed dogs and moved at a relatively great speed and thicker sheet material supported on the surface of said way will only be engaged by said long feed dogs and will therefore be moved at a slower rate.

13. The structure defined in claim 12 in which said short and long feed dogs are spaced approximately 90° apart.

14. The structure defined in claim 12 in further combination with means disposed on opposite sides of said way for supporting sheet material in a vertical position and for heating the same as it is moved progressively by said heating means under the action of the feed mechanism.

15. In an electric toaster, the combination with opposed laterally spaced heating means, feeding mechanism extending longitudinally between said opposed heating means and adapted to engage the bottom edge of sheet material placed vertically thereon and move the same progressively through the space between said opposed heating means, of opposed inwardly pressing yielding means engageable with opposite sides of the sheet material during its passage through the space between the opposed heating means for supporting the sheet material in an upright position, said yielding means being independent of the feed mechanism and having opposed material engaging surfaces that diverge outwardly in a direction opposite to the direction of feed of the sheet material.

16. The structure defined in claim 15 in which the said opposed yielding means are gravity pressed toward one and another.

17. The structure defined in claim 15 in which each said opposed yielding means includes a yielding inwardly pressed longitudinally extended guide shoe slidably and yieldably engageable with an opposite side of sheet material passing by said heating means.

18. In an electric toaster, the combination with opposed laterally spaced heating means, feeding mechanism extending longitudinally between said opposed heating means and adapted to engage the bottom edge of sheet material placed vertically thereon and move the same progressively through the space between said opposed heating means, of yielding means for maintaining sheets of material of different thicknesses laterally centered between the opposed heating means during the passage of such material through the space between the heating means, said yielding means including opposed yieldingly inwardly pressed guide shoes adapted to slidably engage opposite sides of sheet material during its passage between the heating means, the normal space between the guide shoes being less than the thickness of the thinnest sheet material to be passed therebetween, each of said shoes being formed with a sheet material engaging surface that diverges outwardly in a direction opposite to the direction of feed so that material of different thicknesses will be permitted to enter between the opposed shoes and by camming action thereon will spread the shoes a distance equal to the thickness of the material.

19. In an electric toaster, the combination with a toasting oven having a passage for admission of sheet material and opposed heating means disposed therein on opposite sides of said passage, of a unitary baffle device including a like pair of opposed laterally spaced perforated baffle plates insertable into and removable from the oven through said sheet material receiving passage, said baffle plates being located adjacent opposite sides of the passage and being unconnected except at their upper portions so that said passage will be unobstructed, and means connecting said baffle plate rigidly together at a point near the top of the oven passage, whereby to form together with the baffle plates an inverted U in cross section.

20. In an automatic toaster, a combination with a toasting oven having vertical passage way extending longitudinally therethrough for reception of said material on edge, feed mechanism disposed below said oven passage way for engaging the bottom edge of and moving material progressively through the toasting oven, of a unitary baffle device including laterally spaced opposed perforated baffle plates adapted to be inserted into the toasting oven and removed therefrom through said passage, said baffle plates being located adjacent opposite sides of the passage and being unconnected except at their upper portions so that said passage will be unobstructed and means connecting said baffle plates together at a point near the top of the oven passage, whereby to form together with the baffle plates an inverted U in cross section and handle elements projecting from said baffle plates to a point outside of the toasting oven.

21. In an automatic toaster, a toasting oven having a narrow vertical passage extending longitudinally therethrough, heating means disposed within the oven on opposite sides of said passage, feed mechanism disposed below the oven passage for engaging the bottom edge of the sheet material and moving the same progressively through the oven, opposed inwardly yielding pressed guide shoes disposed within the oven on opposite sides of the transverse center of said passage, said yieldingly pressed guide shoes being normally spaced apart a distance less than the thickness of the thinnest sheet material to be passed through the oven and being shaped to form a passage therebetween that diverge outwardly in a direction opposite to the direction of feed, and a unitary baffle device adapted for insertion into and removable from the toasting oven through said passage, said baffle device including a pair of opposed baffle plates adapted to be disposed within the oven adjacent opposite sides of the oven passage way so as to permit sheet material to pass therebetween, and said baffle plates having openings therein for reception of said guide shoes and which permit said guide shoes to engage the material passed between the baffle plates and maintain the same centered therebetween during its passage through the toasting oven.

22. In an electric toaster, the combination with a toasting oven having a vertical passage way therethrough, feed mechanism extending longitudinally of the oven passage in laterally centered relation with respect thereto and adapted to engage the bottom edge of vertically disposed sheet material and move the same progressively through the oven passage; of yielding means for maintaining sheet material of different thicknesses vertically disposed and laterally centered with respect to the oven passage during movement thereof through the oven, said yielding means including opposed yieldingly inwardly pressed guide shoes for slidably engaging opposite sides of sheet material during its passage through the oven, said shoes being formed adjacent their initially engaged ends with cam surfaces that diverge laterally outwardly with respect to the line of feed and in a direction opposite to the direction of feed so as to form between them an outwardly flaring inwardly converging entrance mouth terminating in a neck.

23. In an electric toaster, the combination with opposed laterally spaced heating means, feed mechanism extending longitudinally of the spaced heating means in laterally centered relation with respect thereto and adapted to engage the bottom edge of vertically disposed sheet material and move the same progressively through the space between the opposed heating means; of yielding means for maintaining sheets of material of different thicknesses vertically disposed and laterally centered between the opposed heating means during the passage of such material between the opposed heating means, said yielding means including opposed yieldingly inwardly pressed guide shoes adapted to slidably engage opposite sides of the sheet material during its passage between the heating means, said shoes being formed adjacent their initially engaged ends with cam surfaces that diverge laterally outwardly with respect to the line of feed in a direction opposite the direction of feed so as to form between them an inwardly converging entrance mouth terminating in a neck.

24. I an electric toaster, the combination with opposed laterally spaced heating means, feed mechanism extending longitudinally of the spaced heating means in laterally centered relation with respect thereto and adapted to engage the bottom edge of vertically disposed sheet material and move the same progressively through the space between the opposed heating means; of yielding means for maintaining sheets of material of different thicknesses vertically disposed and laterally centered between the opposed heating means during the passage of such material between the opposed heating means, said yielding means including opposed yieldingly inwardly pressed guide shoes adapted to slidably engage opposite sides of the sheet material during its passage between the heating means, said shoes being formed adjacent their initially engaged ends with cam surfaces that diverge laterally outwardly with respect to the line of feed in a direction opposite the direction of feed so as to form between them an inwardly converging entrance mouth terminating in a neck, the arrangement being such that under normal minimum spacing of the shoes, the maximum width of the mouth formed therebetween will be greater than that of the thickest piece of sheet material to be passed through the oven, and the width of the neck formed therebetween will be sufficiently less than that of the thinnest piece of material contemplated that material of varying thicknesses will be permitted to enter between the opposed shoes, and by camming action thereon, will spread the shoes a distance according to the thickness of the material.

WILLIAM M. ANDERSON.